United States Patent [19]

Todd

[11] Patent Number: 4,688,833

[45] Date of Patent: Aug. 25, 1987

[54] RECREATIONAL VEHICLE DISCHARGE PIPE ADAPTER

[75] Inventor: Harry V. Todd, El Cajon, Calif.

[73] Assignee: Toddco, San Diego, Calif.

[21] Appl. No.: 855,924

[22] Filed: Apr. 25, 1986

Related U.S. Application Data

[63] Continuation-in-part of Ser. No. 800,171, Nov. 14, 1985.

[51] Int. Cl.⁴ ............................................. F16L 55/00
[52] U.S. Cl. .................................... 285/175; 285/177; 285/12; 285/361; 285/376; 285/402; 285/903
[58] Field of Search ................... 285/175, 903, 7, 360, 285/361, 376, 177, 392, 402, 12

[56] References Cited

U.S. PATENT DOCUMENTS

| | | | |
|---|---|---|---|
| 61,607 | 1/1867 | Craig | 285/361 X |
| 549,733 | 11/1895 | Limbert | 285/361 X |
| 2,899,216 | 8/1959 | Brock | 285/903 X |
| 4,174,858 | 11/1979 | Brooks | 285/903 X |

Primary Examiner—Richard J. Scanlan, Jr.
Attorney, Agent, or Firm—Bernard L. Kleinke

[57] ABSTRACT

An adapter for coupling a corrugated drainpipe to recreational vehicle discharge pipe employs a tubular member having a discharge pipe end portion of a shape and size adapted to be placed over an outlet end of the discharge pipe, and a drainpipe end portion having a shape and size adapted to engage threadably an end of a corrugated drainpipe. A helically-shaped thread along the drainpipe end portion are sized and shaped complementary to conform to the corrugations of the corrugated drainpipe enables threaded engagement of the corrugated drainpipe.

10 Claims, 5 Drawing Figures

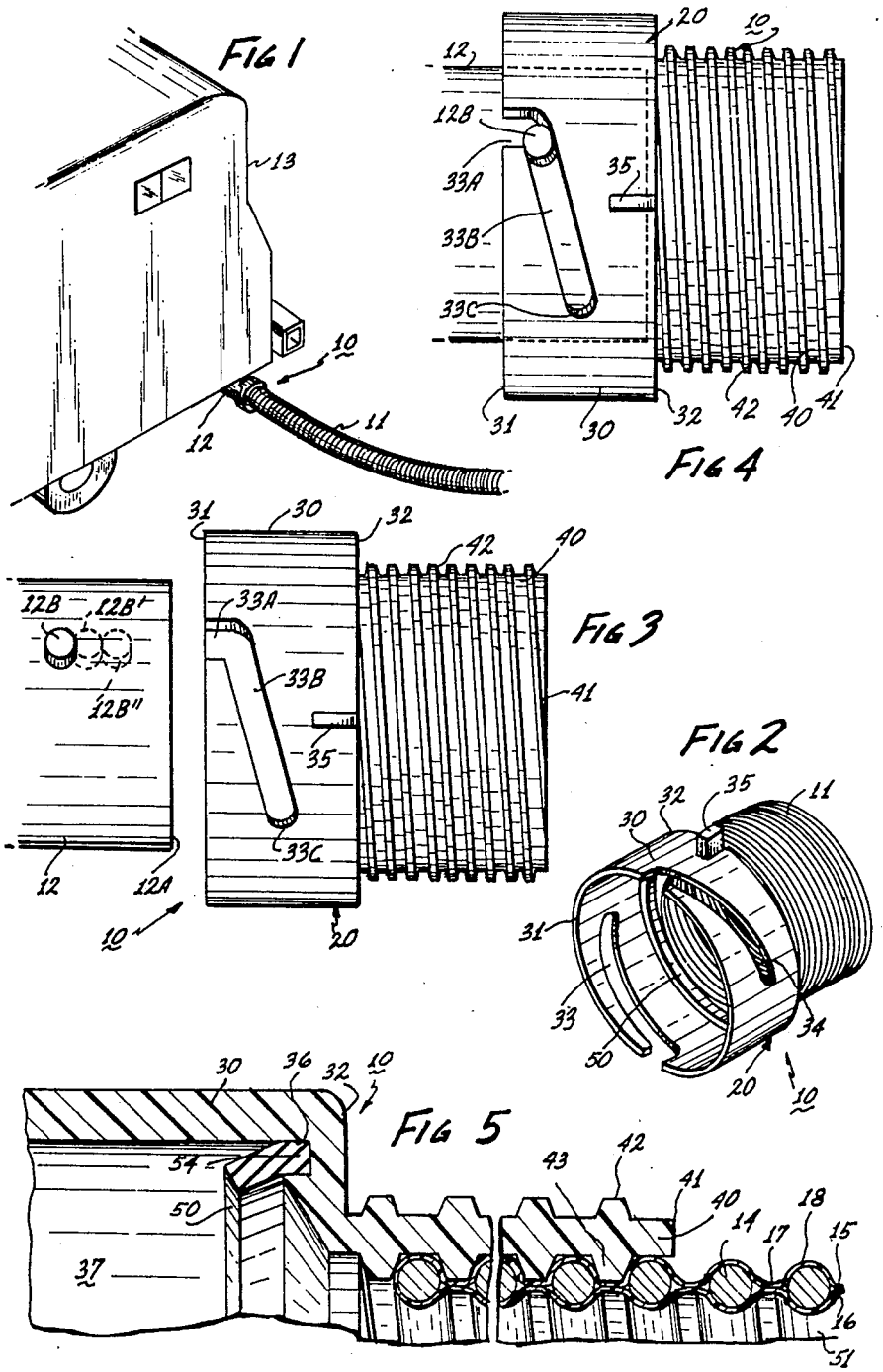

RECREATIONAL VEHICLE DISCHARGE PIPE ADAPTER

CROSS-REFERENCES TO RELATED APPLICATIONS

This application is a continuation-in-part of copending U.S. patent application Ser. No. 800,171, filed Nov. 14, 1985.

BACKGROUND OF THE INVENTION

1. Technical Field

The invention relates generally to flexible pipe adapters and it more particularly relates to an adapter for coupling in fluid communication a corrugated drainpipe to the end of a recreational vehicle discharge pipe.

2. Background Art.

Recreational vehicles vastly improve outdoor life. Like a small cabin on wheels, they house many convenient living accommodations, while providing the mobility that enables rapid transformation from city to country life. Fewer concerns, more time to relax and enjoy, and a welcome degree of security result are of prime importance.

Therefore, in order to maximize the enjoyment of such a vehicle, the maintenance of the on-board equipment should be minimized, during the recreational use of the vehicle. Waste disposal heads the list of work to be minimized, if possile. The recreational vehicle discharge pipe conveniently carries waste to a point outside the vehicle for disposal purposes. One or more sections of flexible extender drainpipe are attached in fluid communication to the discharge pipe to carry the waste under the force of gravity further on to a selected remotely located disposal cite. Many campgrounds even provide a compatible sewer line to simplify further the process. One simply drives the vehicle to a campground or other comfortable spot in the country, and connects the discharge pipe to whatever additional sections of flexible drainpipe are necessary.

Connecting drainpipe to conventional vehicle discharge pipe, does require considerable unwanted and undesirable effort. Consider first the conventional flexible drainpipe commonly employed. Formed from a coiled spring imbedded within a plastic casing, it offers both the strength and flexibility needed for typical camping use. The casing follows the helical outline of the coiled spring to earn it the name "corrugated pipe." Such a drainpipe usually has a diameter of approximately three inches, to provide adequate drainage for most recreational vehicle requirements. Sections of like pipe can be coupled together, end-to-end, with suitable couplers, in fluid communication, to achieve a desired length.

Consider next a typical recreational vehicle discharge pipe. Such a pipe has a short section of pipe terminating in an outlet end at the exterior of the vehicle. The end of a section of drainpipe is forceably attached to the outlet end of the drainpipe by extremely awkward manual manipulations, since the end of the discharge pipe is not constructed to receive the end of the commonly-used flexible drainpipe. In an attempt to overcome this problem, a force-fit prior known coupling adapter have been employed, but they require great skill and strength to use, and are also difficult and time consuming to assemble the adapter to the discharge pipe, and then the flexible drainpipe to the adapter. With the use of the discharge pipe directly, or with the use of the force-fit coupling in both situations, either the discharge pipe or the adapter fit closely onto the drainpipe end, the drainpipe must oftentimes be pried or pounded into place, perhaps in the rain, perhaps in darkness, but, even on a sunny day, with difficulty and often with damage to the drainpipe and to the discharge pipe. Consequently, it is desirable to have some better, easier to install adapter that can be rapidly assembled to the outlet of the discharge pipe, and then to the drainpipe, with little skill and attention.

Once connected, aggravation often continues. The resulting joint is often inadequate. For example, leakage frequently occurs, and the connection can be easily dislodged if bumped accidentally. Stress on the joint caused by drainpipe weight also produces this result. Thus, it is desirable to have a adapter that produces a better, stronger, tighter joint.

Disassembly has its problems as well. Drainpipe must be disassembled after an outing to enable cleaning and storage, and waste material remaining within the drainpipe makes it essential that this be done carefully to avoid strewing the waste about the campsite. The technique of forcing the drainpipe onto the discharge pipe, often only compounds the problem. With the use of force fit, disassembly can be awkward and difficult. Moreover, spillage can occur, when the drainpipe is pulled off the end of the discharge pipe or its adapter. Consequently, it is desirable to have an adapter that functions more predictablly in this respect, to enable controlled disassembly in a neat and clean manner.

There have been many differnt types and kinds of couplers and adapters designed for similar purposes. Refer, for example, to U.S. Pat. Nos. 3,408,091; 3,471,179; 3,493,251; 3,899,198; 4,017,103; 4,133,347; 4,222,594; 4,368,904; 4,480,855; and 4,542,922. However, none of the foregoing patents disclose devices capable of adequately solving the aforementioned problems.

SUMMARY OF THE INVENTION

Therefore, the principal object of the present invention is to provide a new and improved device for coupling a corrugated flexible drainpipe in fluid communication with a discharge pipe, such as the one commonly employed on recreational vehicles, in a quick and facile manner, and in a liquid tight manner.

It is a further object of the present invention to provide such a new and improved adapter which is easy and convenient to install, while providing a joint of substantial mechanical strength.

Yet another object of the present invention is to provide such an adapter, which can be easily and inexpensively manufactured, and readily and conveniently disassembled.

Briefly, the above and further objects of the present invention are realized by providing an adapter for coupling a corrugated drainpipe to recreational vehicle discharge pipe, in a fast, liquid tight manner.

The adapter includes a tubular member having a helically-shaped thread extending along the outer portion of the drainpipe end portion, to engage threadably with the corrugations of corrugated drainpipe. A pair of angular slots at the opposite end of the tubular member receives a pair of outer diametrically opposed pins on the discharge pipe, to enable the member to be locked onto the end of the discharge pipe.

Thus, the drainpipe can be threaded onto the end of the adapter without the need for prying and pounding and excessive manually applied force as conventionally applied, and then the adapter locked onto the discharge pipe, to achieve the easy and convenient installation desired, while providing a highly superior joint, which is tighter, stronger, and far less prone to inopportune dislodgement.

BRIEF DESCRIPTION OF THE DRAWINGS

The above and other objects and features of this invention, and the manner of attaining them, will become apparent, and the invention itself will be best understood, by reference to the following description of an embodiment of the invention, taken in conjunction with the accompanying drawings, wherein:

FIG. 1 is a pictorial, fragmentary view of a recreational vehicle drainpipe adapter constructed according to this invention;

FIG. 2 is a pictorial, fragmentary view of the discharge pipe adapter of FIG. 1 showing it attached to a large diameter drainpipe;

FIG. 3 is an enlarged elevational view of the adapter of FIG. 1, illustrating it assembled to the vehicle discharge pipe;

FIG. 4 is another enlarged elevational view of the adapter of FIG. 1, similar to the illustration of FIG. 2, but shown disassembled from the discharge pipe; and FIG. 5 is an enlarged, fragmentary sectional view of the adapter of FIG. 1, showing another method of attachment to a small diameter drainpipe section.

DESCRIPTION OF THE PREFERRED EMBODIMENT

Referring now to the drawings, and more particularly to FIG. 1 thereof, there is shown a recreational vehicle discharge pipe adapter 10, which is constructed in accordance with the present invention, and which is shown assembled in place on a recreational vehicle 13, coupling the end of a flexible drain pipe 11 to a discharge pipe 12 of the vehicle to interconnect them in fluid communication.

The discharge pipe 12 provides an outlet from recreational vehicle 13 for waste removal purposes, and thus waste flows from the recreational vehicle 13 through the discharge pipe 12, the adapter 10, and the drainpipe 11 to a remotely located disposal site (not shown). By interconnecting the drainpipe 11 and the discharge pipe 12 end-to-end with the adapter 10, a flow path is thereby extended from the discharge pipe 12 to an inlet (not shown) of the remotely located site.

Referring now to FIG. 2-4, the adapter 10 generally comprises a tubular member 20, which is generally circular throughout its axial length and composed of a suitable thermoplastic material, and injection molded according to well known fabrication methods. The member 20 includes an opened discharge pipe end portion 30 which is suitably dimensioned to fit over telescopingly the recreational vehicle discharge pipe 12 of the type being circular in cross-section periphery and having a pair of diametrically disposed, radially projecting lugs or pins, such as the pin 12B (FIGS. 3 and 4), the other radial pin being similar to the pin 12B and not being illustrated.

The tubular member 20 also includes an opened drainpipe end portion 40, which is circular in cross-section, and is suitably dimensioned to fit over and threadably engage an opened end of the corrugated drainpipe 11. Alternatively, as shown in FIG. 5, the end portion 40 can be threaded into a small diameter drainpipe 51.

As shown in FIGS. 2-5, the discharge pipe end portion 30 extends between an opened rear end 31 and an enlarged body portion or midportion 32. For the purpose of providing a quick connection arrangement, a pair of oppositely disposed open bayonet slots 33 and 34 (FIG. 2) in the body portion 32 receive the diametrically disposed radial pins, such as the pin 12B projecting radially from the discharge pipe 12 near its outlet end 12A (FIG. 3). The slots 33 and 34 serve as locking means for enabling engagement with the radial pins when the discharge pipe end portion 30 is placed over the outlet end 12A of the discharge pipe 12, as illustrated in FIG. 3. The slots 33 and 34 enable a quick attachment and quick release of the adapter 10, according to the present invention.

As shown in FIGS. 3 and 4, of the slots are similar to one another, and thus only the slot 33 will now be described in greater detail. The slot 33 includes an axially extending pin receiving entrance portion 33A, and an elongated portion 33B extending angularly axially from the entrance portion 33A and terminating forwardly in a closed, end 33C. This configuration enables use of the adapter 10 with various different discharge pipes having the radial locking pins, such as pins 12B' and 12B'' disposed in somewhat different axially spaced positions on the discharge pipe as illustrated by the broken lines adjacent to the pins 12B in FIG. 3. Thus, the novel slots of the present invention also enable the adapter 10 to fit different discharge pipes having different locking pin locations. In order to assemble the adapter 10 to the discharge pipe 12, the entrance opening 33A is first moved opposite to the pin 12B. The entrance opening of the slot 34 is then positioned properly to receive the other radial locking pin (not shown). The end 31 is then slipped over the end 12A of the discharge pipe 12, until the entrance opening of the slots 33 and 34 receive the radial pins.

Once the pins are seated within the entrance slots, the body portion 30 is rotated manually about its central axis to tighten the tubular member 20 into tight engagement with the end 12A of the pipe 12. As the tubular member 20 rotates about its axis, the bayonet slots move relative to the radial locking pins, until the end 31 abuts and is seated in firm engagement with the end 12A of the pipe 12.

In this manner, the locking pins engage the discharge pipe end portion 30 of the adapter 10 within the slots 33 and 34 to retain the adapter 10 frictionally in place, and tend to prevent relative axial rotation of the adapter 10 and the pipe 12. For the purpose of removing the adapter 10 from the pipe 12, a reverse sequence of manipulation may be quickly performed even in the dark.

A pair of diametrically opposed radial gripping lugs, such as the lug of ear 35 (FIGS. 2-4), serves to provide convenient projecting members that can be readily gripped to twist the adapter, either on or off the pipe 12. These gripping lugs can be gripped manually or with a tool such as a wrench.

Considering now the forward drainpipe end portion 40 extending forwardly from the body protion 32 to distal end 41 (FIGS. 2-5), the portion 40 is provided with an exterior thread 42 and an interior thread 43 for threaded engagement with the larger pipe 11, or alternatively, the smaller pipe 51. As shown in FIG. 5, the drainpipe 51 fits within the drainpipe end portion 40, and thus it is threadably engaged by the interior thread 43. The exterior thread 42 engages the interior surface of a section of drainpipe 11, as shown in FIG. 2. Exterior thread 42 and interior thread 43 are complementary shaped and dimensioned to engage threadably the helically-corrugated contour of a conventional section of the flexible drainpipe 11. As shown in FIG. 5, the smaller diameter drainpipe 51, which is similar in construction to the drainpipe 11, includes a coiled, hardened steel spring 14, embedded between outer sheet plastic casing 15 and inner sheet plastic casing or material 16 to provide the outer thread-like groove 17 and lands 18 to enable threaded engagement of the drainpipe 51 with the interior thread 43 of the adapter 10. By providing a thread which mates with the helically-corrugated casing of a conventional recreational vehicle drainpipe, the adapter 10 can be threaded onto the drainpipe section, to provide a superior, low pressure coupling.

As shown in FIG. 5, an annular internal groove 36 provided within interior 37 of the adapter 10, at the front 32 of the body 30, receives inwardly extending annular flange member 50, as a stop for limiting drainpipe travel as it is screwed into the tubular member and for a low pressure seal. Annular projection 54 on the inwardly extending flange member 50 is attached to the adapter 10 within annular groove 36 by suitable means, such as an adhesive cement or bonding (not shown).

The outer surface of the front end 32 of the body portion 30 serves a similar stop function for the drainpipe 51 and a seal function.

Thus, the adapter of this invention provides a significant improvement over prior known adapters. The adapter is twisted onto the discharge pipe and conveniently locked in place. The drainpipe is then threadably connected to the adapter 10.

Disassembly is equally convenient. The line is first disconnected from the adapter by backing the drainpipe threadably from the adapter, which is then twisted off of the discharge pipe. The adapter and drainpipe are transported by hand away from the vehicle for cleaning purposes and then brought back to the vehicle for storage.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An adapter for coupling a corrugated drainpipe to a vehicle discharge pipe having an outer annular edge and a plurality of pins extending radially outwardly from the periphery of the discharge pipe, said adapter comprising:
    a tubular member of unitary one-piece construction for insertion between the corrugated drainpipe and the vehicle discharge pipe;
    a discharge pipe end portion of the tubular member having a complementary shape and size to interconnect telescopically in fluid communication with a discharge pipe;
    a drainpipe end portion of the tubular member, having a complementary shape and size adapted to engage threadably an end of a corrugated drainpipe, and defining an internal shoulder with said discharge pipe and portion;
    thread means defining a helically-shaped thread extending axially along the drainpipe end portion and being complementary sized and shaped relative to the corrugations of the corrugated drainpipe for enabling threaded engagement of the corrugated drainpipe;
    quick connection means on the opposite end of the tubular member for enabling a fast low-pressure connection with the discharge pipe, said connection means defining a plurality of slots in the discharge pipe end portion, so disposed as to receive the corresponding pins of the discharge pipe; and
    seal means connected to the discharge pipe end portion of said internal shoulder to engage sealingly the outer annular edge of the discharge pipe and to be drawn tightly thereupon when the pins engage said connection means.

2. The adapter recited in claim 1, wherein:
    the thread means includes an exterior thread.

3. The adapter recited in claim 1, wherein:
    the thread means includes an interior thread.

4. The adapter recited in claim 1, wherein:
    the tubular member is composed of a thermoplastic material.

5. The adapter recited in claim 1, wherein:
    the pair of slots extend from an outlet end of the discharge pipe end portion, axially along the tubular member toward the drainpipe end portion.

6. The adapter recited in claim 1, further comprising:
    stop means for limiting drainpipe travel within the tubular member.

7. The adapter recited in claim 6, wherein:
    the stop means includes an inwardly extending flange within the tubular member between the discharge pipe end portion and the drainpipe end portion.

8. The adapter recited in claim 1, further comprising:
    gripping means attached to the tubular member for providing a projecting member that can be gripped to rotate the tubular member in place on the discharge pipe.

9. The adaptor recited in claim 8, wherein:
    the gripping means includes a pair of outwardly-extending, oppositely-disposed lugs.

10. An adapter for coupling a corrugated drainpipe to a vehicle discharge pipe, comprising:
    a tubular member;
    a discharge pipe end portion of the tubular member having a complementary shape and size to interconnect telescopically in fluid communication with a discharge pipe;
    a drainpipe end portion of the tubular member, having a complementary shape and size adapted to engage threadably an end of a corrugated drainpipe;
    thread means defining a helically-shaped thread extending axially along the drainpipe end portion and being complementary sized and shaped relative to the corrugations of the corrugated drainpipe for enabling threaded engagement of the corrugated drainpipe, wherein the thread means includes both an exterior thread and an interior thread for enabling threaded engagement of different drainpipe sizes; and
    quick connection means on the opposite end of the tubular member for enabling a fast low-pressure connection with the discharge pipe.

* * * * *

UNITED STATES PATENT AND TRADEMARK OFFICE
CERTIFICATE OF CORRECTION

PATENT NO. : 4,688,833
DATED : August 25, 1987
INVENTOR(S) : Harry V. Todd

It is certified that error appears in the above-identified patent and that said Letters Patent are hereby corrected as shown below:

Column 4, Line 62: "protion" should read --portion--
Column 5, Line 67: "and" should read --end--

Signed and Sealed this

Twenty-sixth Day of April, 1988

Attest:

DONALD J. QUIGG

Attesting Officer     Commissioner of Patents and Trademarks